United States Patent
Hall et al.

(10) Patent No.: US 9,779,258 B2
(45) Date of Patent: Oct. 3, 2017

(54) CONFIDENTIAL EXTRACTION OF SYSTEM INTERNAL DATA

(71) Applicant: INTERNATIONAL BUSINESS MACHINES CORPORATION, Armonk, NY (US)

(72) Inventors: William E. Hall, Yorktown Heights, NY (US); Andreas Koenig, Boeblingen (DE); Cedric Lichtenau, Boeblingen (DE); Elaine Rivette Palmer, Hanover, NH (US); Thomas Pflueger, Boeblingen (DE); Peter A. Sandon, Essex Junction, VT (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 56 days.

(21) Appl. No.: 14/925,286

(22) Filed: Oct. 28, 2015

(65) Prior Publication Data

US 2016/0125188 A1 May 5, 2016

(30) Foreign Application Priority Data

Oct. 30, 2014 (GB) .................................. 1419282.7

(51) Int. Cl.
*H04L 29/06* (2006.01)
*G06F 21/62* (2013.01)
*H04L 9/08* (2006.01)

(52) U.S. Cl.
CPC ............ *G06F 21/62* (2013.01); *H04L 9/0825* (2013.01)

(58) Field of Classification Search
CPC ............................... G06F 21/62; H04L 9/0825
See application file for complete search history.

(56) References Cited

U.S. PATENT DOCUMENTS 5,295,188 A * 3/1994 Wilson .................... H04L 9/302
235/379
6,134,660 A * 10/2000 Boneh ................. G06F 21/6209
380/201

(Continued)

FOREIGN PATENT DOCUMENTS

GB 2446173 8/2008

OTHER PUBLICATIONS

Leo Dorrendorf, "Protecting Drive Encryption Systems Against Memory Attacks", dated May 6, 2011, pp. 1-15, https://eprint.iacr.org/2011/221.pdf.

(Continued)

*Primary Examiner* — David Garcia Cervetti
(74) *Attorney, Agent, or Firm* — Margaret McNamara; Matthew M. Hulihan; Heslin Rothenberg Farley & Mesiti PC

(57) ABSTRACT

Secure extraction of state information of a computer system is provided. A method includes obtaining, by a security engine of a system, a public encryption key associated with a private decryption key; generating an extraction key that is inaccessible outside of the security engine; encrypting the extraction key with the public encryption key, to thereby obtain an encrypted extraction key; collecting state information of the system; encrypting the collected state information with the extraction key and storing the encrypted collected state information; and based on a request for access to the stored encrypted collected state information by a request for the extraction key, providing the extraction key to facilitate decryption of the stored encrypted state information.

20 Claims, 5 Drawing Sheets

(56) References Cited

U.S. PATENT DOCUMENTS

| | | | |
|---|---|---|---|
| 6,170,058 B1* | 1/2001 | Kausik | G06F 21/6245 705/71 |
| 6,574,733 B1* | 6/2003 | Langford | G06F 21/606 713/193 |
| 6,700,993 B1* | 3/2004 | Minematsu | G06T 1/005 380/201 |
| 7,133,990 B2 | 11/2006 | Link et al. | |
| 7,484,060 B2 | 1/2009 | Kelly et al. | |
| 7,802,111 B1* | 9/2010 | Tahan | G06F 21/57 380/259 |
| 7,920,706 B2* | 4/2011 | Asokan | H04L 9/0866 380/201 |
| 8,171,309 B1 | 5/2012 | Poo et al. | |
| 8,621,196 B2 | 12/2013 | Pasam et al. | |
| 8,656,191 B2 | 2/2014 | Kudelski | |
| 2001/0018736 A1* | 8/2001 | Hashimoto | G06F 21/10 713/1 |
| 2002/0049900 A1* | 4/2002 | Patrick | H04L 63/0442 713/151 |
| 2002/0053024 A1* | 5/2002 | Hashimoto | G06F 21/125 713/168 |
| 2003/0033537 A1* | 2/2003 | Fujimoto | G06F 21/123 713/193 |
| 2004/0030911 A1* | 2/2004 | Isozaki | G06F 21/10 713/193 |
| 2004/0054792 A1* | 3/2004 | Pitsos | H04L 63/02 709/229 |
| 2004/0210757 A1* | 10/2004 | Kogan | B60R 25/00 713/182 |
| 2004/0255199 A1* | 12/2004 | Yamashita | G06F 21/629 714/37 |
| 2005/0071337 A1* | 3/2005 | Baranczyk | G06F 17/30477 |
| 2006/0106721 A1* | 5/2006 | Hori | H04L 9/0838 705/51 |
| 2006/0182282 A1* | 8/2006 | Negahdar | H04L 9/0825 380/277 |
| 2006/0242465 A1* | 10/2006 | Cruzado | G01R 31/31705 714/30 |
| 2006/0257102 A1* | 11/2006 | Park | G11B 20/00173 386/259 |
| 2006/0281480 A1* | 12/2006 | Klug | H04L 63/0442 455/518 |
| 2007/0043978 A1* | 2/2007 | Cruzado | G06F 21/86 714/38.1 |
| 2007/0226786 A1* | 9/2007 | Berger | G06F 21/57 726/9 |
| 2007/0271461 A1* | 11/2007 | Hardy | G01R 31/31705 713/176 |
| 2008/0095375 A1* | 4/2008 | Tateoka | H04L 9/085 380/282 |
| 2008/0195740 A1* | 8/2008 | Lowell | H04L 29/06 709/229 |
| 2008/0216177 A1* | 9/2008 | Yokosato | G06F 21/10 726/26 |
| 2009/0112769 A1* | 4/2009 | Dicks | G06Q 50/22 705/51 |
| 2009/0122988 A1* | 5/2009 | Schuba | H04L 9/0825 380/277 |
| 2009/0282036 A1* | 11/2009 | Fedtke | G06F 21/6254 |
| 2010/0211932 A1* | 8/2010 | Jones | G06F 11/3624 717/124 |
| 2011/0142242 A1* | 6/2011 | Tanaka | H04L 9/0858 380/282 |
| 2011/0167258 A1* | 7/2011 | Schibuk | H04L 63/0823 713/156 |
| 2011/0185192 A1* | 7/2011 | Kito | G06F 21/805 713/193 |
| 2011/0246767 A1* | 10/2011 | Chaturvedi | G06F 21/53 713/164 |
| 2011/0246986 A1 | 10/2011 | Nicholas et al. | |
| 2012/0297201 A1* | 11/2012 | Matsuda | G06F 21/6245 713/189 |
| 2012/0311337 A1* | 12/2012 | Wuschek | G06Q 30/0601 713/176 |
| 2013/0132719 A1* | 5/2013 | Kobayashi | G06F 21/10 713/158 |
| 2013/0145177 A1 | 6/2013 | Cordella et al. | |
| 2013/0151848 A1* | 6/2013 | Baumann | H04L 9/3263 713/164 |
| 2013/0246813 A1* | 9/2013 | Mori | G06F 17/30289 713/193 |
| 2013/0282951 A1 | 10/2013 | Kuo et al. | |
| 2014/0006877 A1 | 1/2014 | Zhu et al. | |
| 2014/0047427 A1* | 2/2014 | Evans | G06F 9/45529 717/168 |
| 2014/0059356 A1 | 2/2014 | Nesnow | |
| 2014/0089667 A1* | 3/2014 | Arthur, Jr. | G06F 21/57 713/171 |
| 2014/0108818 A1* | 4/2014 | Choi | G06F 21/57 713/189 |
| 2014/0143548 A1 | 5/2014 | Wang | |
| 2014/0201533 A1* | 7/2014 | Kruglick | H04L 63/062 713/171 |
| 2014/0208097 A1* | 7/2014 | Brandwine | H04L 9/3263 713/156 |
| 2014/0208111 A1* | 7/2014 | Brandwine | H04L 63/0428 713/171 |
| 2015/0033031 A1* | 1/2015 | Swaminathan | G06F 21/577 713/187 |
| 2015/0089244 A1* | 3/2015 | Roth | G06F 21/6209 713/193 |
| 2015/0169851 A1* | 6/2015 | Boivie | G06F 11/362 713/167 |
| 2015/0172260 A1* | 6/2015 | Brenner | H04L 63/083 713/171 |
| 2015/0281273 A1* | 10/2015 | Shields | G06F 21/552 713/171 |
| 2015/0288685 A1* | 10/2015 | Li | G06F 21/123 713/159 |
| 2015/0295911 A1* | 10/2015 | Sumioka | H04L 63/0807 726/4 |
| 2015/0319140 A1* | 11/2015 | Qiu | H04L 63/04 713/162 |
| 2015/0350045 A1* | 12/2015 | Fan | H04L 43/0823 709/224 |
| 2016/0087947 A1* | 3/2016 | Wong | H04L 63/107 713/171 |

OTHER PUBLICATIONS

"Memory Encryption Method", ip.com, dated Mar. 1, 2004, https://priorart.ip.com/IPCOM/000022197.

* cited by examiner

US 9,779,258 B2

CONFIDENTIAL EXTRACTION OF SYSTEM INTERNAL DATA

PRIOR FOREIGN APPLICATION

This application is based on and claims the benefit of priority from United Kingdom Application 1419282.7, filed on Oct. 30, 2014, which is hereby incorporated herein by reference in its entirety.

BACKGROUND

Computer systems running customer workloads often include confidential and/or sensitive data. For a system fault or a performance analysis, it may be desired to extract data from a customer computer system and send it to the vendor of the computer system, however the data may include customer data and internal data about the computer system itself.

SUMMARY

Shortcomings of the prior art are overcome and additional advantages are provided through the provision of a computer-implemented method that includes: A computer-implemented method comprising: obtaining, by a security engine of a system, a public encryption key associated with a private decryption key; generating an extraction key that is inaccessible outside of the security engine; encrypting the extraction key with the public encryption key, to thereby obtain an encrypted extraction key; collecting state information of the system; encrypting the collected state information with the extraction key and storing the encrypted collected state information; and based on a request for access to the stored encrypted collected state information by a request for the extraction key, providing the extraction key to facilitate decryption of the stored encrypted state information.

Further, a computer system is provided that includes a memory; and a processor in communications with the memory. The computer system is configured to perform a method that includes: obtaining, by a security engine of a system, a public encryption key associated with a private decryption key; generating an extraction key that is inaccessible outside of the security engine; encrypting the extraction key with the public encryption key, to thereby obtain an encrypted extraction key; collecting state information of the system; encrypting the collected state information with the extraction key and storing the encrypted collected state information; and based on a request for access to the stored encrypted collected state information by a request for the extraction key, providing the extraction key to facilitate decryption of the stored encrypted state information.

Yet further, a computer program product is provided, that includes a computer readable storage medium readable by a processor and storing instructions for execution by the processor for performing a method that includes: obtaining, by a security engine of a system, a public encryption key associated with a private decryption key; generating an extraction key that is inaccessible outside of the security engine; encrypting the extraction key with the public encryption key, to thereby obtain an encrypted extraction key; collecting state information of the system; encrypting the collected state information with the extraction key and storing the encrypted collected state information; and based on a request for access to the stored encrypted collected state information by a request for the extraction key, providing the extraction key to facilitate decryption of the stored encrypted state information.

Additional features and advantages are realized through the concepts of the present invention. Other embodiments and aspects of the invention are described in detail herein and are considered a part of the claimed invention.

BRIEF DESCRIPTION OF THE DRAWINGS

Embodiments of the invention will now be described, by way of example only, and with reference to the following drawings.

DETAILED DESCRIPTION

Figure 1:
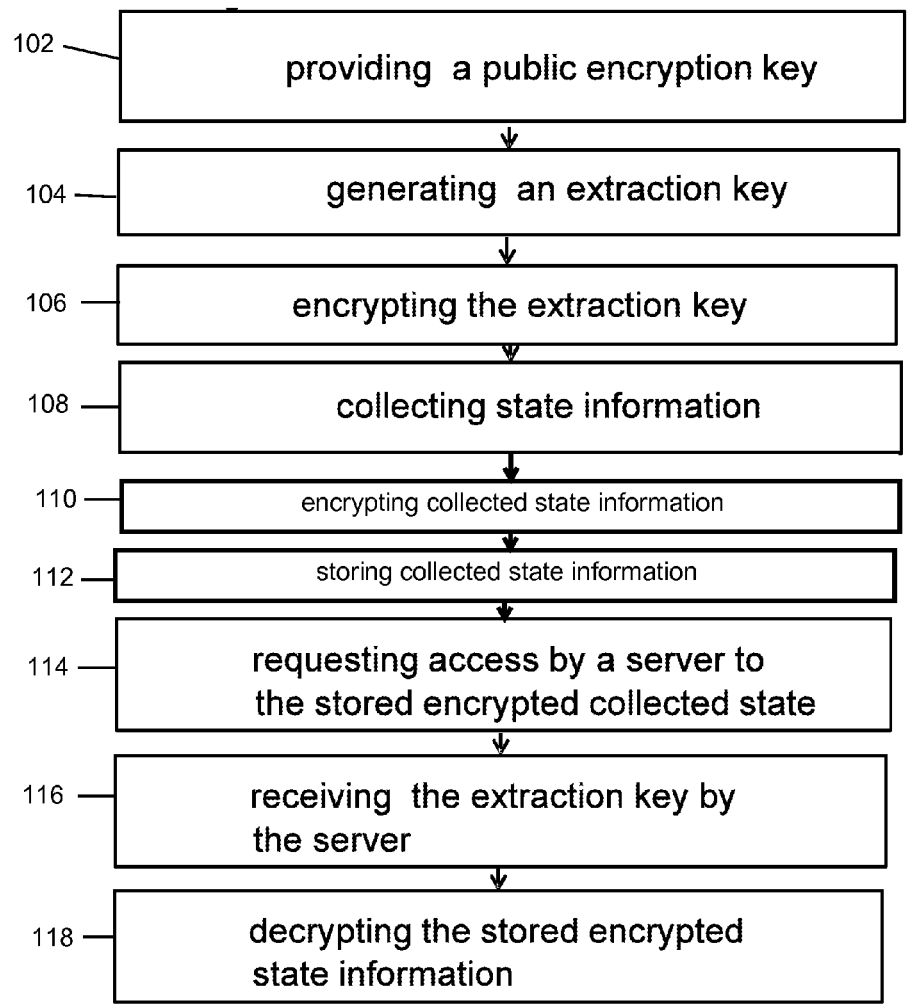
FIG. 1 shows an embodiment of a method in accordance with aspects described herein.

Aspects described herein relate generally securely extracting state information of a computer system and further to a security engine for securely extracting state information of a computer system, a data processing program, and a computer program product.

Some customers may expect controlled encryption of data sent to a vendor. Other customers may like to decide whether the vendor sees the data, and some industries, like the medical industry, may have legal concerns about the exchange of data altogether.

Some approaches exist, such as letting the customer provide an encryption solution or turn off the data collection altogether. These approaches are poor answers to security and confidentiality. The customer has no control over the data collection if the customer only provides the encryption, and in the infrastructure may not be compromised. Cloud environments used by customers are not addressed by this solution. Only private cloud environments may have this sort of data security using the above-described approach.

In modern public cloud environments, there is an increased desire for confidentiality and data security in the coming years, as a comparably large amount of data is moved out to cloud environments as compared to today's private data centers.

There are approaches related to methods for extracting state information of a computer system.

U.S. Pat. No. 7,484,060 B2, which is hereby incorporated herein by reference in its entirety, discloses systems, methods and computer products for protecting information during troubleshooting. A dumping mechanism includes marking at least one of a plurality of memory regions in a computer-readable medium as non-dumpable, initiating a core dump, determining which memory regions of the plurality regions are non-dumpable, and dumping the contents only if memory regions are not marked as non-dumpable.

U.S. Pub. 2013/0282951 A1, which is hereby incorporated herein by reference in its entirety, discloses systems, methods and computer program products for secure rebooting and debugging a peripheral sub-system of a system on a chip device (SoC). According to one aspect of the method, when an application processor of the SoC detects a crash of the peripheral sub-system, the application processor loads a secure boot agent into the device memory. This secure boot agent is configured to access the security memory region of the peripheral sub-system comprising memory dump data associated with the peripheral sub-system. The secure memory region is inaccessible to the application process. The secure boot agent is configured to access a secure memory region of the application processor. The application processor accesses the secure memory region and collects the encrypted memory dump data. The application processor then formats the encrypted memory dump data to the third party for debugging purposes.

However, there may be a desire for an elegant end-user controlled method for providing data security and allowing a vendor insight into a customer computer system for problem detection and troubleshooting in cloud environments.

In the context of this description, the following conventions, terms and/or expressions may be used:

The term "state information" may denote information about internal states of a computer system or information about programs being executed on the computer system. The information may include the program code itself—in particular, operating system program code or application program code—or related data. Thus, state information may include any information for troubleshooting in case of a malfunction of a computer system. It may be noted that the computer system may also be a virtual machine including a CPU, memory, peripheral devices, communication links, and the like. Basically, state information may include anything to describe a status of a computer system at any time.

The term "public encryption key" may denote an element of a pair of related encryption keys. The second element of such a pair is typically denoted as "private decryption key". These keys may be used in asymmetric cryptographic encryption/decryption methods.

The term "security engine" may denote an additional element of a computer system, independently executing steps of extraction key generation and encrypting data, in particular state information of the computer system. The operation of the security engine may not be compromised or influenced by user code.

The term "extraction key" may denote a decryption key to decrypt encrypted state information of a computer system. An asymmetric cryptographic method or a symmetric cryptographic method may be used for the extraction key.

Aspects described herein, such as proposed method(s) for securely extracting state information of a computer system, may offer several benefits.

Customers having sensitive data and programs on their computer systems may maintain complete control over the kind of data or state information being sent to a vendor of the computer system in case of problems with the computer system. Troubleshooting by the vendor is not performed automatically on state information on the computer system if the computer system automatically informs the vendor of the computer system about problems. This may also include preventive maintenance, i.e., if a vendor connects regularly to a customer computer system for checking the status of the computer system to prevent malfunction.

The customer may maintain complete control of any access to information, in particular state information, on the customer's computer system by the vendor. This may also apply to cloud computing environments and/or multi-tenant computer systems running in, e.g., cloud computing centers. In such a case, vendor access to customer data or state information about virtual machines of different customers may be prevented. This may be best achieved by different encryption keys and different extraction keys for different virtual machines running on a physical computer system. Proposed method(s) and system(s) described herein may allow a fine-grained access to state information under complete control of a customer. Thus, also for sensitive industries, like the healthcare sector, remote maintenance may be offered to customers in such sensitive industries without compromising data security and/or data privacy.

According to one embodiment of a method, the encrypted state information may be stored on a remote storage system. This may be, e.g., a cloud storage system. Thus, the state information may not be stored on storage systems of the computer system in question. The remote storage system may also be located at a vendor's premise. However, because of the missing extraction key, the vendor may not access the state information unless the vendor has access to the extraction key. Hence, although the vendor may have physical access to the state information of a customer computer system, the vendor may not analyze the state information because it is encrypted.

Additionally, the encrypted extraction key may be stored together with the encrypted state information.

According to a further embodiment of a method, multiple sets of encrypted state information originating from multiple computer systems or a multi-tenant computer system may be stored on the storage system, which may be remote. The multi-tenant computer system may execute different virtual machines on which application programs of different customers may be executed. The same may apply for multiple computer systems in a computing center in which different computer systems relating to different customers may be operated. A vendor may not have access to state information of different computer systems or virtual machines because the related sets of state information may be encrypted with different extraction keys. Only customers may have control over the selected extraction key to the state information. A customer may decide, according to the customer's own policy, to grant or deny access to each independent extraction key and for each vendor's request for troubleshooting. Hence, state information of different virtual machines running on the same physical machine in a multi-tenant cloud environment may be accessible independently from each other. Data privacy may be guaranteed.

According to a related embodiment of the method, an extraction key may be generated for each set of encrypted state information. This may guarantee that different state information sets of different customers are not accessible with the same extraction key. Additionally, once a vendor obtains one extraction key, it does not permit the vendor to decrypt all state information sets belonging to that customer, such as those captured at different points in time. However, it may be noted that some extraction keys for different computer systems or virtual machines relating to different state information may be identical if, e.g., the computer systems or virtual machines may relate to the same customer. This may reduce administrative overhead for both, the customer and the vendor.

According to one more embodiments of a method, the computer system is a virtual machine having an identifier.

Thus, it may be the case that no differentiation is made between physical and virtual machines, in that the method may be applicable to either.

According to a further embodiment of a method, the collected state information may also refer to an underlying hardware system of the virtual machine, and each set of collected state information may include only state information relating to one identifier. This way, a complete environment for a dedicated virtual machine may be mapped to related state information. At the same time, data privacy among different customers in a cloud computing environment running different virtual machines on one physical computer system may be guaranteed.

According to an additional embodiment of a method, the generating an extraction key, the encrypting the extraction key with the public encryption key, and the encrypting the collected state information with the extraction key may be performed by a security engine separate to the processor of the computer system. Hence, dedicated elements within a CPU (central processing unit) with one or more cores may be responsible for collecting the state information and encrypting these state information and related extraction keys; namely, the security engine. The operation of the security engine may, in some embodiments, not be influenced and/or may not able to be influence by user code; user code may only be executed by the CPU.

Furthermore, embodiments may take the form of a computer program product, accessible from a computer-usable or computer-readable medium providing program code for use, by or in connection with a computer or any instruction execution system. A computer-usable or computer-readable medium may be any apparatus that may contain means for storing, communicating, propagating or transporting the program for use, by or in a connection with the instruction execution system, apparatus, or device.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Examples of optical disks include compact disk-read only memory (CD-ROM), compact disk-read/write (CD-R/W), DVD and Blu-Ray-Disk.

It should also be noted that embodiments of the invention are described with reference to different subject-matters. In particular, some embodiments are described with reference to method type claims whereas other embodiments are described with reference to apparatus type claims. However, a person skilled in the art will gather from the aspects disclosed herein that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined/described herein and embodiments of the present invention are apparent from examples of embodiments described herein and are explained with reference to examples of embodiments, but to which the invention is not limited.

A detailed description of the figures is provided in the following. Instructions in the figures are schematic. Initially, an embodiment of an inventive method for securely extracting state information of a computer system is given. Additionally, further embodiments of a security engine for securely extracting state information of a computer system is described.

FIG. 1 shows an embodiment of a method for securely extracting state information of a computer system (e.g. 600 of FIG. 6), in accordance with aspects described herein. The shown method includes providing (102) to a security engine a public encryption key associated with a private decryption key. The encryption/decryption key pair may be provided by a secure source to the computer system. The security engine may be implemented in hardware and may include a separate processor or micro-controller. Other methods than the mentioned encryption/decryption method for an encryption of the extraction key may also be possible.

The method 100 includes also generating (104) an extraction key which is not accessible by instruction(s), in particular not accessible by any unsecure component of the computer system, e.g., a user program or the computing core(s) of the computer system. However, the extraction key may be accessible by the security engine. It may indeed be generated by the security engine.

The method 100 includes also encrypting (106) the extraction key with the public encryption key, thereby obtaining an encrypted extraction key. This may be achieved by the security engine.

Figure 6:
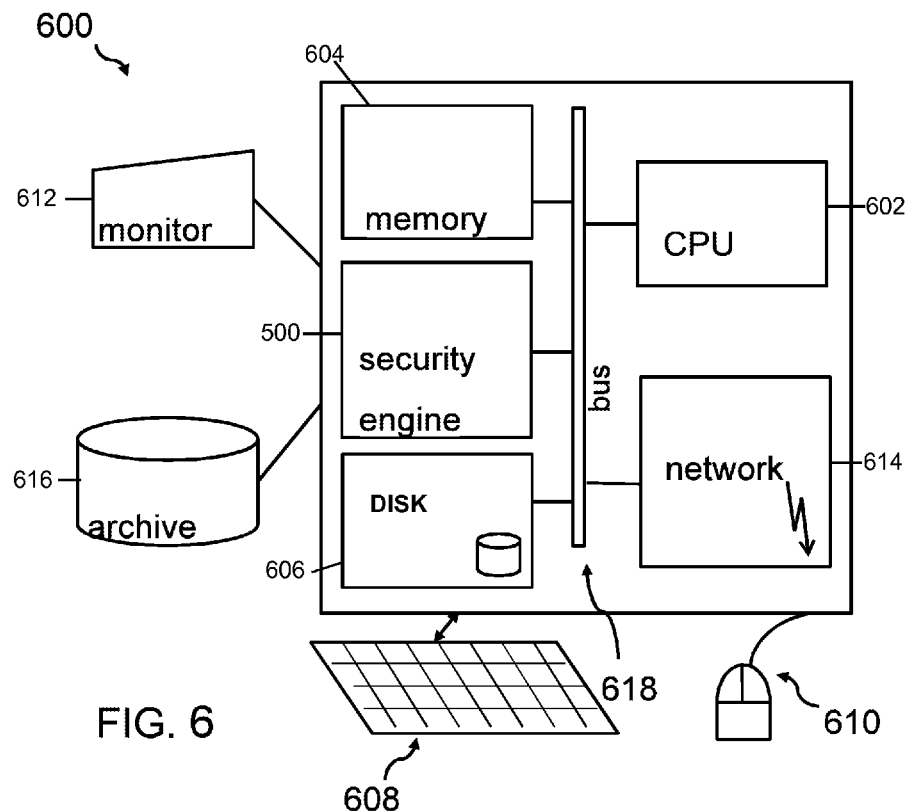
FIG. 6 shows an embodiment of a computing system including a security engine, in accordance with aspects described herein.

Furthermore, the method 100 includes collecting (108) state information of the computer system (e.g. 600 of FIG. 6). The state information may include information about the CPU or other components of the computer system as well as environmental parameters, like temperature, humidity, air pressure, time, and so on. Additionally, information about register content, memory content or more specific error messages may be included in the state information. Additionally, program code and related data may be included in the state information. Thus, the state information may include a more or less complete picture about the status of the computer. This state information may also apply to virtual machines and its logical components running on the physical computer system.

Additionally, the method 100 uses the extraction key to encrypt (110) the collected state information and store (112) the encrypted collected state information. These aspects may be performed by the security engine. The encrypted extraction key (e.g. 404 of FIG. 4) may be stored separately, or along with the encrypted state information. Next, the computer system may receive a request (as in FIG. 1, #114) from a server. This may be a server of a service provider for the computer system (e.g. 600 of FIG. 6) or the vendor of the computer system (e.g. 600 of FIG. 6) providing maintenance and services to the computer system (e.g. 600 of FIG. 6). Accordingly, the server may request (114) access to the stored encrypted collected state information by requesting the encrypted collected state information as well as the extraction key. The customer may send the extraction key to the vendor in a secure manner.

In response to receiving (116) the extraction key by the server, the method includes decrypting (118) the stored encrypted state information using the extraction key.

Figure 2:
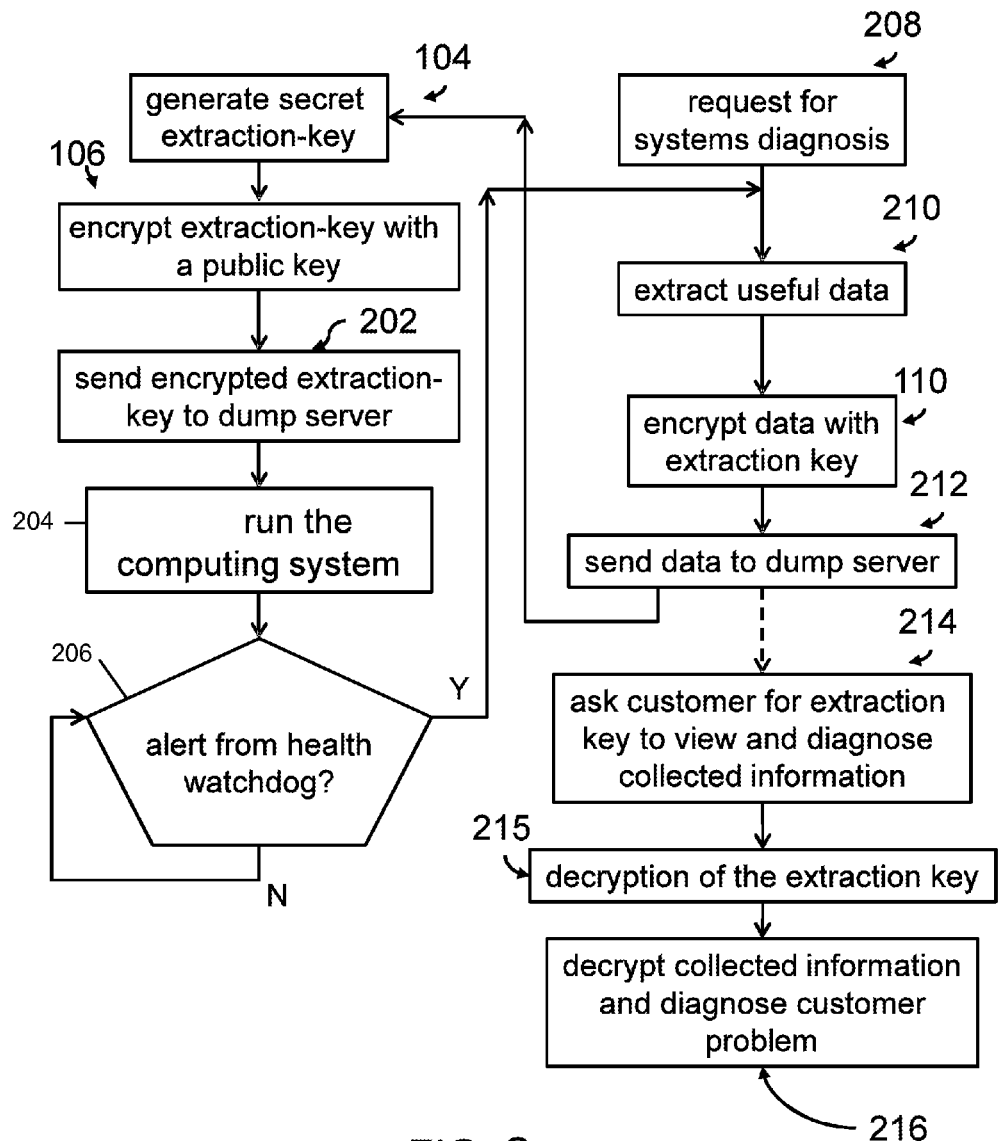
FIG. 2 shows another embodiment of method in accordance with aspects described herein.

FIG. 2 shows another embodiment of method in accordance with aspects described herein and including additional features. From a different perspective, the method may also be described in the following form. Same or equivalent aspects—as compared to aspects of FIG. 1—have the same reference numerals. Initially, at each boot process or for each data extraction, an extraction key may be generated (104). The extraction key may be encrypted (106) with a public key of a public/private key pair. The encrypted extraction key may be sent (202) to a dump server. The dump server may located remote from the premise of the customer.

Then, the computer system (e.g. 600 of FIG. 6) may be run (204) in normal mode. A service engine (e.g. 310 of FIG. 3) may supervise the function of the computer system (e.g. 600 of FIG. 6). Such a watchdog function may recognize abnormal statuses of the computer system. In case no alert from the computer system health watchdog is generated (i.e. "Y" at 206), the computer system (e.g. 600 of FIG. 6) continues in normal mode. If the computer system health watchdog of the service engine (e.g. 310 of FIG. 3) generates an alert (case "Y") or if a customer requests (208) for a system diagnosis, e.g. by the vendor or service provider, then status information or, in other words, useful data for troubleshooting may be extracted/collected (210). The security engine (e.g. 310 of FIG. 3) may then encrypt (110) the status information using the extraction key, and may send (212) the data to, for example, the dump server.

The vendor may then ask (214) the customer for the extraction key to view and diagnose the collected status information. The customer may decrypt (215) the extraction key, then may send it to the vendor in a secure manner. Next, the vendor may (216) decrypt the collected status information and may diagnose the problem of the customer's computer system (e.g. 600 of FIG. 6).

Figure 3:
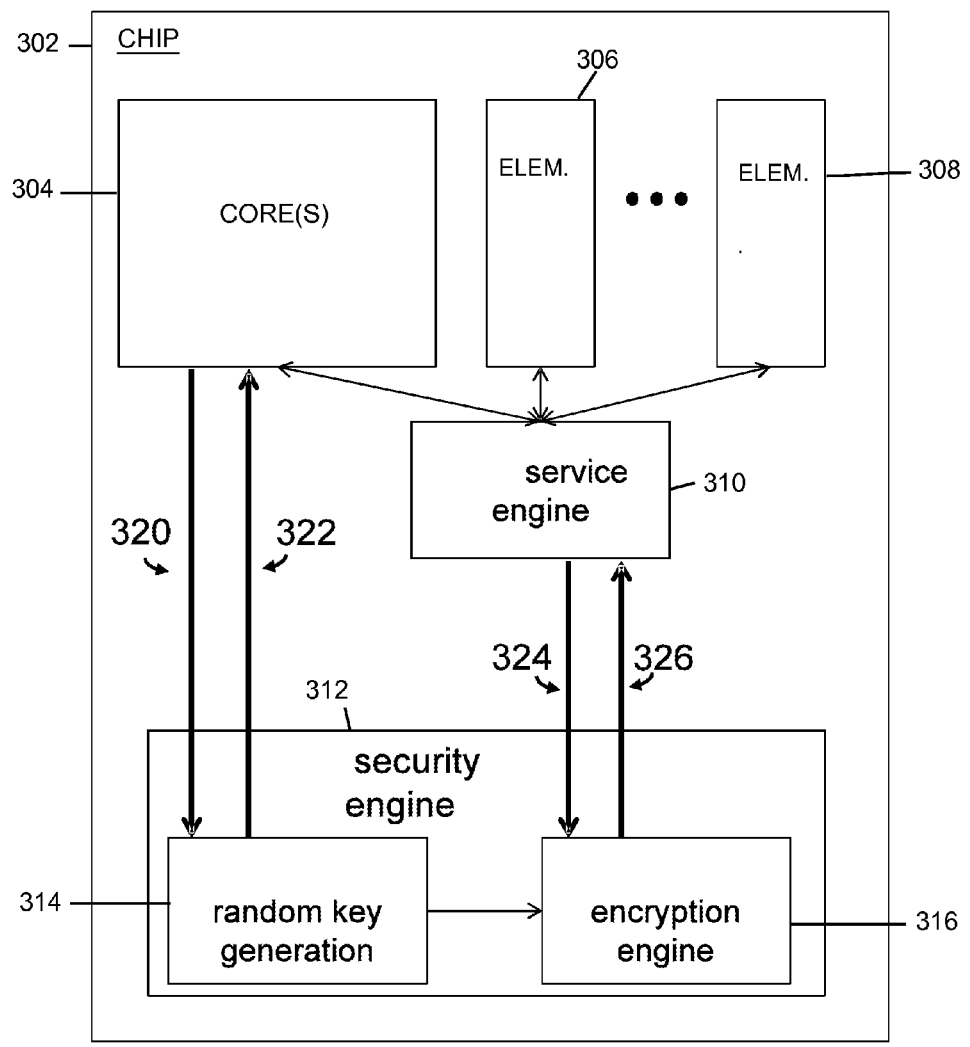
FIG. 3 shows a block diagram of an example security engine on a chip, in accordance with aspects described herein.

FIG. 3 shows a block diagram of an example security engine on a chip 302, in accordance with aspects described herein. The chip 302 may be an extended version of a central processing unit of the computer system (e.g. 600 of FIG. 6). It may include one or more cores 304 and several other computing infrastructure elements 306, 308. The chip 302 may also include a service engine 310 supervising normal functionality of all elements of the chip, e.g., the cores 304 and the other elements 306, 308. Additionally, on the chip a security engine 312 may be implemented. It may be a communicative connection to the one or more cores 304 and the service engine 310. The core may supply (320) a public key for an encryption to a random key generator 314. Here, the generated extraction key may be encrypted and delivered (322) back encrypted to the core 304.

The service engine, once a malfunction or an alert has been created, may receive a request to extract status information of the chip and/or other components of the computer system. The service engine may deliver (324) the collected status information to the encryption engine 316 as part of the security engine 312. The service engine 310 may receive back (326) the encrypted status information from the security engine/the encryption engine 316.

Figure 4:
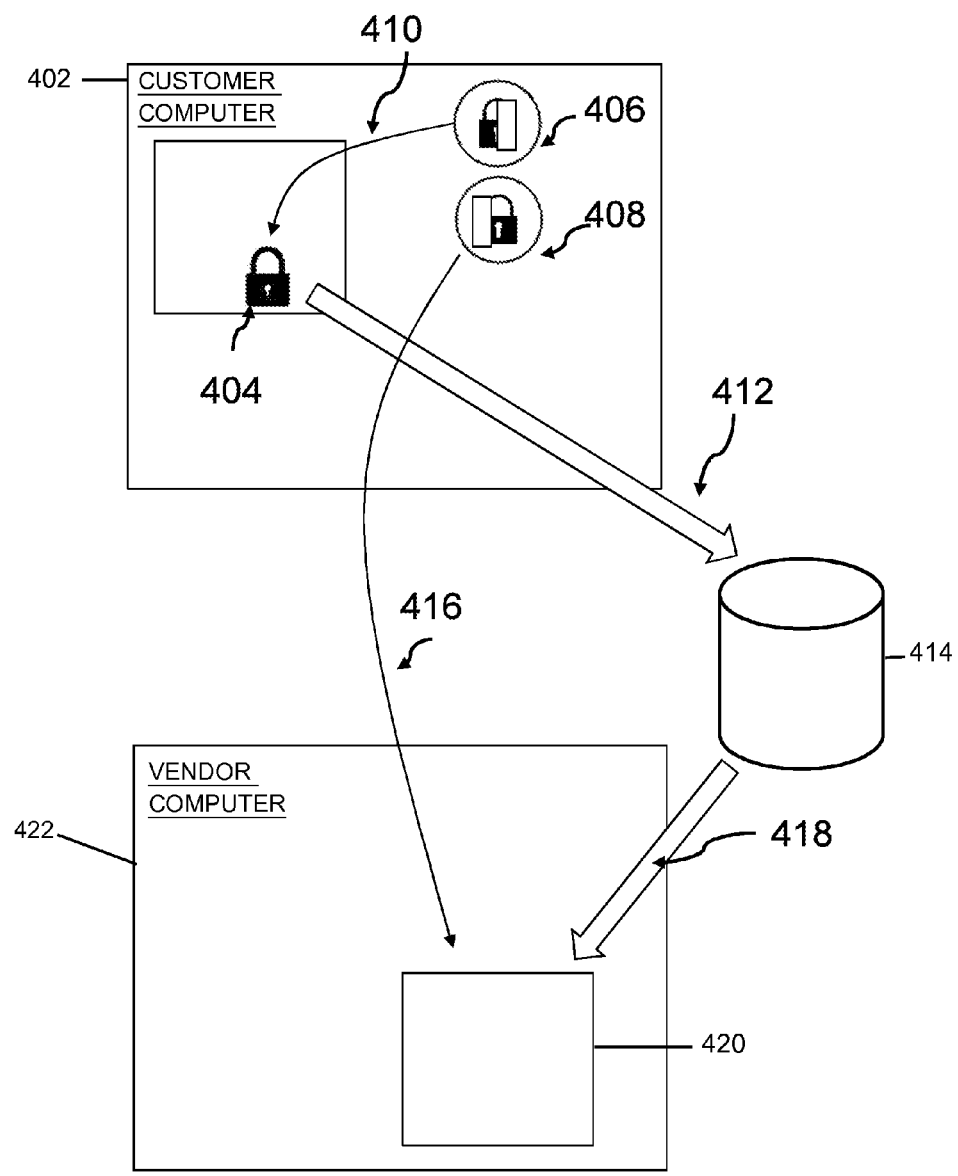
FIG. 4 shows an embodiment of a general information flow among constituents of a method in accordance with aspects described herein.

FIG. 4 shows an embodiment of general information flow among constituents of the method 100, in accordance with aspects described herein. In FIG. 4, the public and private key pair is denoted as 406 and 408. Reference numeral 410 shows that the extraction key 404 may be encrypted with the public key 406. The encrypted extraction key 404 may be saved on the customer site or at a remote site, e.g., together with the encrypted state information. In general, the computer system on the customer site is denoted as 402. This could be a computer system of the customer or a chip of a computer system (see FIG. 3).

Once status information may be encrypted on the customer site 402 with the extraction key 404, the status information may be sent, 412, to a dump server 414. The dump server 414 may be located on the customer site 402, or it may be a cloud storage system. The dump server 414 may also be located on the premise of the vendor.

If the customer requests to have his status information debugged, i.e., troubleshooting may be required by the vendor, the customer may decrypt the extraction key 404, then send (416) the encrypted extraction key 404 to the vendor's computer or server 422 in a secure manner.

After the vendor may receive the extraction key 404, the vendor may access (418) then decrypt the status information stored on the dump server 414 for analysis and troubleshooting, 420.

By controlling the extraction key, customers have complete control over the data and status information that the vendor may see, decrypt, and analyze.

Figure 5:
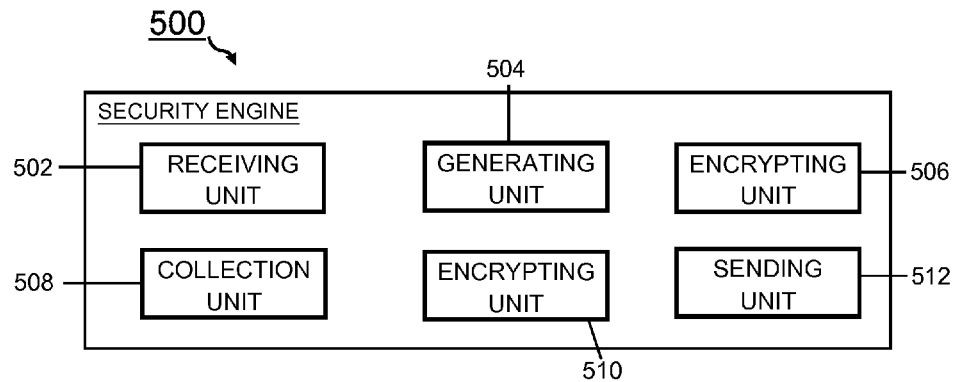
FIG. 5 shows a block diagram of an example security engine, in accordance with aspects described herein.

FIG. 5 shows a block diagram of an example security engine 500, in accordance with aspects described herein.

In an abstract form, the security engine 500 for securely extracting state information of a computer system (e.g. 600 of FIG. 6) may include a receiving unit 502 adapted for receiving a public encryption key associated with a private decryption key for a security engine of the computer system, a generating unit 504 adapted for generating an extraction key which is not accessible outside the security engine, i.e. by any user code, unsecure code or entity in the processor, and a first encrypting unit 506 adapted for encrypting the extraction key with the public encryption key, thereby obtaining an encrypted extraction key.

Furthermore, the security engine may include a collection unit 508 adapted for collecting state information of the computer system, a second encrypting unit 510 adapted for encrypting the collected state information with the extraction key and storing the encrypted collected state information, and a sending unit 512 adapted for sending the encrypted extraction key upon request.

Aspects described herein may be addressed by a method for securely extracting state information of a computer system, a security engine for securely extracting state information of a computer system, a computing system, a data processing program, and a computer program product.

According to one aspect, a method for securely extracting state information may include providing a public encryption key associated with a private decryption key to a security engine of the computer system, generating an extraction key which is not accessible outside the security engine, and encrypting the extraction key with the public encryption key, thereby obtaining an encrypted extraction key. The method may further include collecting state information of the computer system, and encrypting the collected state information with the extraction key and storing the encrypted collected state information.

A server may request access to the stored encrypted collected state information by requesting the extraction key, and in response to receiving the extraction key by the server, decrypting the stored encrypted state information with the extraction key.

According to another aspect, a security engine for securely extracting state information of a computer system may be provided. The security engine may include a receiving unit adapted for receiving a public encryption key associated with a private decryption key by a security engine of the computer system, a generating unit adapted for generating an extraction key which is not accessible outside the security engine, and a first encrypting unit adapted for encrypting the extraction key with the public encryption key, thereby obtaining an encrypted extraction key.

The security engine may further include a collection unit adapted for collecting state information of the computer system, a second encrypting unit adapted for encrypting the collected state information with the extraction key and storing the encrypted collected state information, and a sending unit adapted for sending the extraction key upon requesting access by a server to the stored encrypted collected state information by requesting the extraction key, such that the stored encrypted state information is decryptable by the server using the extraction key.

It may be noted that the computer system may be owned and operated by a customer, whereas the server may be owned and operated by a vendor or a service provider. Thus, the computer system and the server and its data may be owned by different entities.

It may also be noted that the extraction key may not be accessible outside the security engine, in particular by the processor and/or by user code.

Embodiments of the invention may be implemented together with virtually any type of computer, regardless of the platform being suitable for storing and/or executing program code. For example, in an embodiment of a computing system including a security engine as shown in FIG. 6, a computing system 600 may include one or more processor(s) 602 with one or more cores per processor, associated memory elements 604, an internal storage device 606 (e.g., a hard disk, an optical drive, such as a compact disk drive or digital video disk (DVD) drive, a flash memory stick, a solid-state disk, etc.), and numerous other elements and functionalities, typical of today's computers (not shown). The memory elements 604 may include a main memory, e.g., a random access memory (RAM), employed during actual execution of the program code, and a cache memory, which may provide temporary storage of at least some program code and/or data in order to reduce the number of times, code and/or data must be retrieved from a long-term storage medium or external bulk storage 616 for an execution. Elements inside the computer 600 may be linked together by means of a bus system 618 with corresponding adapters. Additionally, the security engine 500—this time not as part of the chip 402 (as in FIG. 4) may be attached to the bus system 618.

The computing system 600 may also include input means such as a keyboard 608, a pointing device such as a mouse 610, or a microphone (not shown). Alternatively, the computing system may be equipped with a touch sensitive screen as main input device. Furthermore, the computer 600, may include output means such as a monitor or screen 612 (e.g., a liquid crystal display (LCD), a plasma display, a light emitting diode display (LED), or cathode ray tube (CRT) monitor). The computer system 600 may be connected to a network (e.g., a local area network (LAN), a wide area network (WAN)), such as the Internet or any other similar type of network, including wireless networks via a network interface connection 614. This may allow a coupling to other computer systems, or a storage network, or a tape drive. Those, skilled in the art will appreciate that many different types of computer systems exist, and the aforementioned input and output means may take other forms. Generally speaking, the computer system 600 may include at least the minimal processing, input and/or output means, necessary to practice embodiments of the invention.

While embodiments of the invention have been described with respect to a limited number of embodiments, those skilled in the art, having benefit of this disclosure, will appreciate that other embodiments may be devised, which do not depart from the scope of the invention, as disclosed herein. Accordingly, the scope of embodiments of the invention should be limited only by the attached claims. Also, elements described in association with different embodiments may be combined.

As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that may contain, or store, a program for use, by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described with reference to flowchart illustrations and/or block diagrams of methods, apparatus (systems) and computer program products according to embodiments of the present disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that may direct a computer, other programmable data processing apparatus, or other devices to function in a particular manner, such that the instructions stored in the computer readable medium produce an article of manufacture including instructions, which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions, which execute on the computer or other programmable apparatus, provide processes for implementing the functions/acts specified in the flowchart and/or block diagram, block, or blocks.

The block diagrams in the Figures illustrate the architecture, functionality, and operation of possible implementations of systems, methods and computer program products, according to various embodiments of the present disclosure. In this regard, each block in the block diagrams may represent a module, segment, or portion of code, which comprises one or more executable instructions for implementing the specified logical function(s). It should also be noted that, in some alternative implementations, the functions, discussed hereinabove, may occur out of the disclosed order. For example, two functions taught in succession may, in fact, be executed substantially concurrently, or the functions may sometimes be executed in the reverse order depending upon the functionality involved. It will also be noted that each block of the block diagrams, and combinations of blocks in the block diagrams, may be implemented by special purpose hardware-based systems that perform the specified functions or acts, or combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiment was chosen and described in order to best explain the principles of the invention and the practical application, and to enable others of ordinary skills in the art to understand the invention for various embodiments with various modifications, as are suited to the particular use contemplated.

The invention claimed is:

1. A computer-implemented method comprising:
obtaining, by a security engine of a first computer system, a public encryption key associated with a private decryption key;
generating an extraction key that is initially inaccessible outside of the security engine of the first computer system;
encrypting the extraction key with the public encryption key, to thereby obtain an encrypted extraction key;
collecting state information of the first computer system;
encrypting the collected state information with the extraction key and storing the encrypted collected state information on a storage system; and
based on a request by a second computer system different from the first computer system for access to the stored encrypted collected state information being stored on the storage system, by a request for the extraction key, providing the initially inaccessible extraction key to the second computer system to facilitate decryption of the stored encrypted state information.

2. The method of claim 1, wherein the storage system is remote from the first computer system.

3. The method of claim 2, wherein multiple sets of encrypted state information originating from multiple computer systems or a multitenant system are stored on the storage system.

4. The method of claim 3, wherein a respective extraction key is generated for each set of encrypted state information of the multiple sets of encrypted state information.

5. The method of claim 3, wherein the first computer system comprises a virtual machine having a system identifier.

6. The method of claim 5, wherein the collected state information also refers to an underlying hardware system to the virtual machine, and wherein each set of encrypted state information of the multiple sets of encrypted state information comprises state information relating to a respective system identifier.

7. The method of claim 1, wherein the generating the extraction key, the encrypting the extraction key with the public encryption key, and the encrypting the collected state information with the extraction key is performed by the security engine separate from a processor of the first computer system.

8. A computer system comprising:
a memory; and
a processor in communication with the memory, wherein the computer system is configured to perform a method comprising:
obtaining, by a security engine of a first computer system, a public encryption key associated with a private decryption key;
generating an extraction key that is initially inaccessible outside of the security engine of the first computer system;
encrypting the extraction key with the public encryption key, to thereby obtain an encrypted extraction key;

collecting state information of the first computer system;

encrypting the collected state information with the extraction key and storing the encrypted collected state information on a storage system; and based on a request by a second computer system different from the first computer system for access to the stored encrypted collected state information being stored on the storage system, by a request for the extraction key, providing the initially inaccessible extraction key to the second computer system to facilitate decryption of the stored encrypted state information.

9. The computer system of claim 8, wherein the storage system is remote from the first computer system.

10. The computer system of claim 9, wherein multiple sets of encrypted state information originating from multiple computer systems or a multitenant system are stored on the storage system.

11. The computer system of claim 10, wherein a respective extraction key is generated for each set of encrypted state information of the multiple sets of encrypted state information.

12. The computer system of claim 10, wherein the first computer system comprises a virtual machine having a system identifier.

13. The computer system of claim 12, wherein the collected state information also refers to an underlying hardware system to the virtual machine, and wherein each set of encrypted state information of the multiple sets of encrypted state information comprises state information relating to a respective system identifier.

14. The computer system of claim 8, wherein the generating the extraction key, the encrypting the extraction key with the public encryption key, and the encrypting the collected state information with the extraction key is performed by the security engine separate from a processor of the first computer system.

15. A computer program product comprising:

a non-transitory computer readable storage medium readable by a processor and storing instructions for execution by the processor for performing a method comprising:

obtaining, by a security engine of a first computer system, a public encryption key associated with a private decryption key;

generating an extraction key that is initially inaccessible outside of the security engine of the first computer system;

encrypting the extraction key with the public encryption key, to thereby obtain an encrypted extraction key;

collecting state information of the first computer system;

encrypting the collected state information with the extraction key and storing the encrypted collected state information on a storage system; and based on a request by a second computer system different from the first computer system for access to the stored encrypted collected state information being stored on the storage system, by a request for the extraction key, providing the initially inaccessible extraction key to the second computer system to facilitate decryption of the stored encrypted state information.

16. The computer program product of claim 15, wherein the storage system is remote from the first computer system.

17. The computer program product of claim 16, wherein multiple sets of encrypted state information originating from multiple computer systems or a multitenant system are stored on the storage system.

18. The computer program product of claim 17, wherein a respective extraction key is generated for each set of encrypted state information of the multiple sets of encrypted state information.

19. The computer program product of claim 17, wherein the first computer system comprises a virtual machine having a system identifier.

20. The computer program product of claim 19, wherein the collected state information also refers to an underlying hardware system to the virtual machine, and wherein each set of encrypted state information of the multiple sets of encrypted state information comprises state information relating to a respective system identifier.

* * * * *